L. B. GRISWOLD.
Potato-Digger.
No. 25,010.
Patented Aug. 9, 1859.
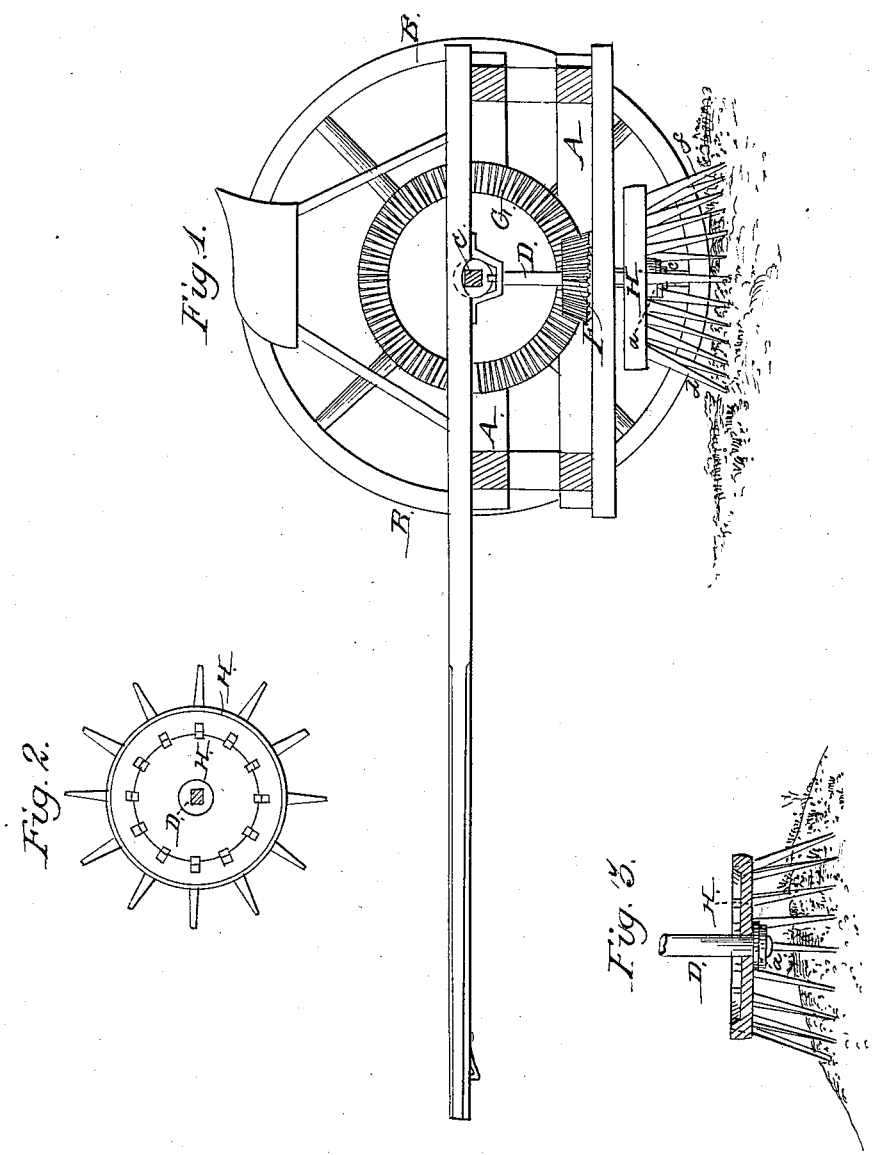
Witnesses:
Inventor:
Leonard B. Griswold

UNITED STATES PATENT OFFICE.

LEONARD B. GRISWOLD, OF EAST PENFIELD, NEW YORK.

IMPROVEMENT IN POTATO-DIGGERS.

Specification forming part of Letters Patent No. 25,010, dated August 9, 1859.

*To all whom it may concern:*

Be it known that I, LEONARD B. GRISWOLD, of East Penfield, in the county of Monroe and State of New York, have invented a new and Improved Machine for Digging Potatoes; and I do hereby declare that the following is a full and exact description thereof, reference being had to the accompanying drawings, and to the letters of reference marked thereon.

Figure 1 is a vertical longitudinal section of my machine. Fig. 2 is a plan view of the revolving fork detached. Fig. 3 is a section of the same, showing its operation in digging.

Similar letters refer to corresponding parts in all of the figures.

The distinguishing characteristic of my invention consists in the mechanical operation of a fork to imitate to some extent the manipulations of that implement by human hands, and so constructing it as to employ advantageously the power of machinery to increase its efficiency. To accomplish this I take a disk or a plate or frame of metal of circular form and of suitable strength, H, Fig. 1, which I place horizontally on the vertical spindle D. Around the periphery of this I arrange at regular intervals a number of prongs or tines, their shanks passing through the rim of the disk and firmly secured by a nut or other fastening. Their direction is downward and inclined outward or diverging from the axis D, so as to enter the ground at about the angle at which a spade or other implement for uplifting the soil would be inserted. This rotary fork I hang with its spindle in the center of a frame, A, which is suspended from the axis of a pair of truck-wheels, B. On the spindle a small beveled pinion, D, gears with and is driven by the large driving-wheel G on the axle C of the truck-wheels. The axle rotates with the truck-wheels, thereby giving the motion to the driver G. One of the wheels is attached to the axle by a ratchet to enable the machine to back or turn around without operating the fork.

The machine is drawn by a team, the truck-wheels passing in the space between the rows and the fork operating directly on the row. It can be raised or lowered on the spindle by means of a nut, *e*, and washers *a*, to work deep or shallow, as the nature of the soil and position of the tubers require. The forward prongs, *d*, enter the ground, raising the potatoes from the earth and carrying them by its revolving motion to the gutter on one side, where they are deposited and left on the surface. Advancing by the forward motion of the machine, every part of the row is successfully acted upon, and the rear teeth or tines, *f*, repeat the operation in a counter direction, eradicating any tubers that may have escaped the first. The tines enter the ground with an easy uplifting motion by means of the angle at which they are set, and the forward sweeping motion which results from the combination of the rotation with the advancing motion closely imitates the motion given the implement in rapid hand-spading. It is remarkably effective in removing potatoes from the ground and leaving them on the surface, while from the simplicity of the operating parts it works with great ease. It is not liable to the objections that apply to many more complicated machines for the purpose, as it does not clog and is little liable to get out of repair. Should a tooth break, it can be replaced by inserting another in a few moments. It levels the ground by throwing the ridges into the hollows, and leaves it pulverized in a good condition for the succeeding crop.

I am aware that horizontal revolving wheels with teeth therein have been employed as harrows and cultivators, and such I do not claim, but confine myself to the described construction and application. Therefore

I claim—

The employment of a rotating head or disk having teeth or spurs arranged around an upright shaft in a direction oblique to the axis thereof, in combination with the truck B and driving-wheel G F, or their equivalents, for giving the required motion, substantially as and for the purpose set forth.

LEONARD B. GRISWOLD.

Witnesses:
J. FRASER,
S. J. ALLIS.